United States Patent
Schug et al.

(10) Patent No.: US 7,137,199 B2
(45) Date of Patent: Nov. 21, 2006

(54) METHOD OF INSERTING A BEARING JACKET AND A MONOLITH INTO A PIPE

(75) Inventors: Norbert Schug, Herschweiler-Pettersheim (DE); Bernd Müller, Völklingen (DE); Gerhard Bungert, Wellesweiler (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 343 days.

(21) Appl. No.: 10/658,570

(22) Filed: Sep. 9, 2003

(65) Prior Publication Data
US 2004/0052884 A1   Mar. 18, 2004

(30) Foreign Application Priority Data
Sep. 12, 2002   (DE) ............................... 102 42 283

(51) Int. Cl.
*B21D 51/16*   (2006.01)
*B21D 39/00*   (2006.01)
(52) U.S. Cl. .............................. 29/890; 29/508; 29/515
(58) Field of Classification Search .................. 29/890, 29/896.62, 508, 515, 517, 505; 72/370.23
See application file for complete search history.

(56) References Cited
U.S. PATENT DOCUMENTS
3,441,382 A   4/1969   Keith et al.

4,144,627 A * 3/1979 Noda et al. ..................... 29/890
5,118,476 A * 6/1992 Dryer et al. ................. 422/179
6,000,131 A * 12/1999 Schmitt ........................ 29/890
6,317,976 B1 * 11/2001 Aranda et al. ................ 29/890
6,405,437 B1 * 6/2002 Sussmilch et al. ....... 29/890.08

FOREIGN PATENT DOCUMENTS
DE   44 33 974   3/1996
EP   1 138 892   10/2001
JP   58 32917   2/1983

* cited by examiner

*Primary Examiner*—Marc Jimenez
*Assistant Examiner*—Sarang Afzali
(74) *Attorney, Agent, or Firm*—Collard & Roe, P.C.

(57) ABSTRACT

The present invention relates to a method of pressing a bearing jacket (2) onto a monolith (3) of a catalytic converter, in particular in a motor vehicle.

Figure 2:
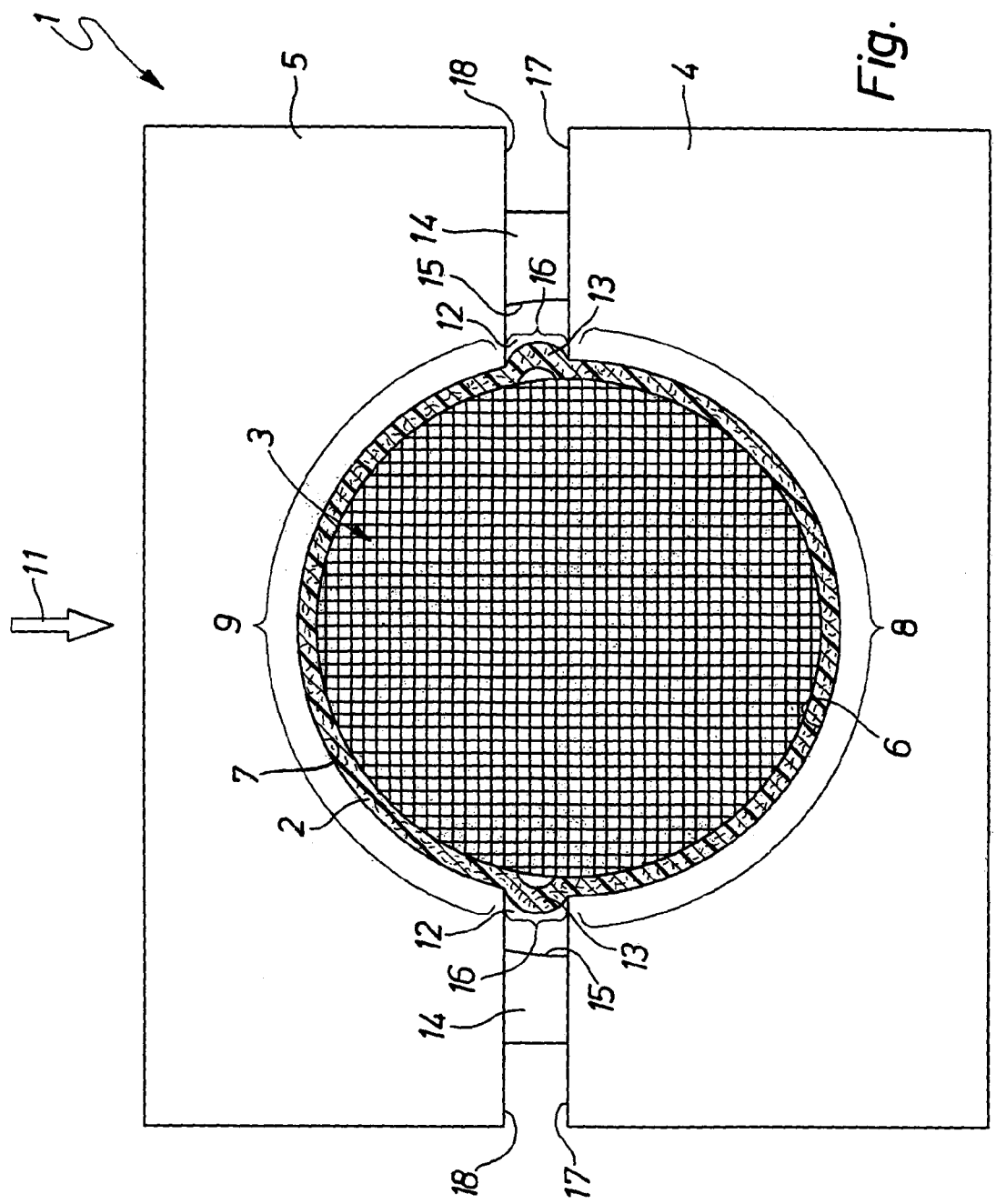

The bearing jacket (2) surrounding the monolith (3) on the perimeter is pressed during an initial phase onto the monolith (3) in a first peripheral section (8) and in a second peripheral section (9), whereby the two peripheral sections (8, 9) together are smaller than the total circumference of the monolith (3) surrounded by the bearing jacket pressed onto it. The bearing jacket (2) is pressed onto the monolith (3) during a subsequent second phase in at least one third peripheral section (16), which is situated between the first peripheral section (8) and the second peripheral section (9), whereby the first peripheral section (8) and the second peripheral section (9) together with all the third peripheral sections (16) are the same size as the total circumference.

4 Claims, 3 Drawing Sheets

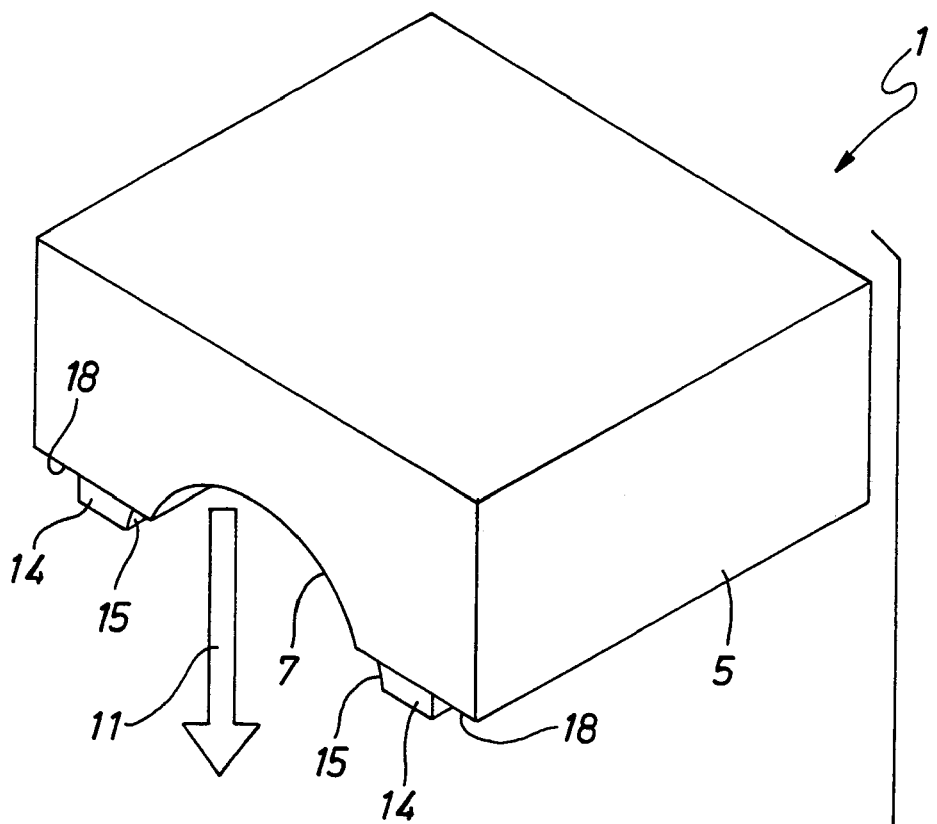
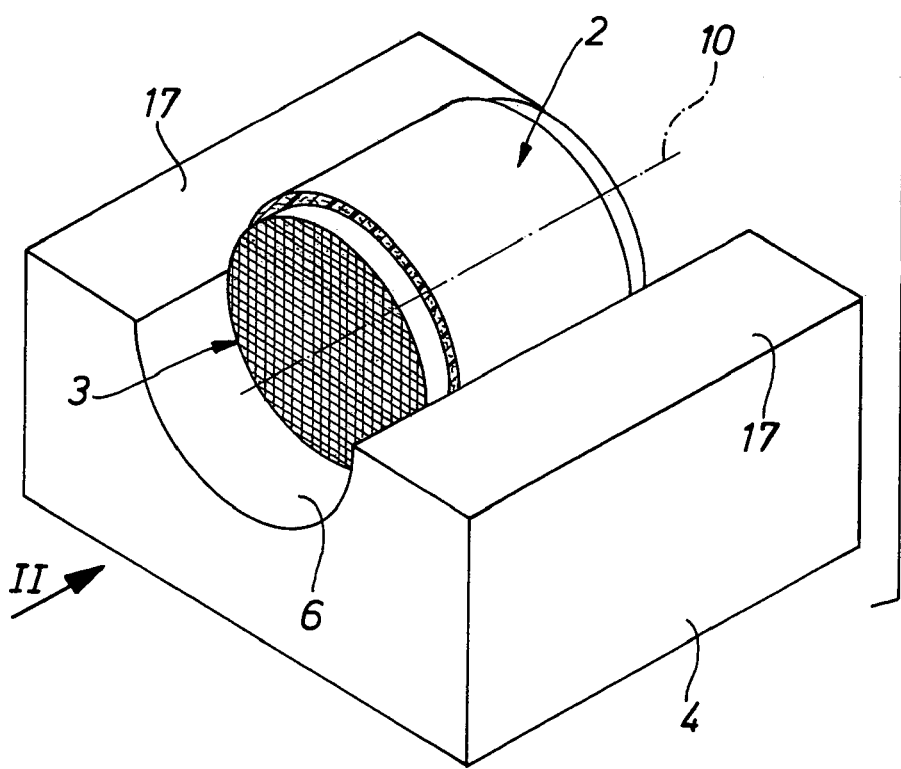
Fig. 1

METHOD OF INSERTING A BEARING JACKET AND A MONOLITH INTO A PIPE

CROSS REFERENCE TO RELATED APPLICATIONS

Applicants claim priority under 35 U.S.C. §119 of German Application No. 102 42 283.4 filed on Sep. 12, 2002.

The present invention relates to a device and a method for pressing a bearing jacket onto a monolith of a catalytic converter, in particular in a motor vehicle, having the features of the preamble of claim 1 and/or claim 11.

It is known from German Patent 44 33 974 C1 that a monolith surrounded by a bearing jacket can be pressed through an insertion funnel to yield a prefabricated pipe. On insertion into the pipe, the bearing jacket is pressed onto the monolith at the same time due to the tapering cross section of the funnel.

The present invention is concerned with the problem of finding another advantageous way to press a bearing jacket onto a monolith.

This problem is solved according to this invention by the subjects of the independent claims. Advantageous embodiments are the subject of the dependent claims.

This invention is based on the general idea of performing the pressing of the bearing jacket onto the monolith in two successive phases, whereby in a prior first phase, two relatively large peripheral sections of the bearing jacket are pressed against the monolith by means of corresponding molds, at least one gap remaining between the peripheral sections such that no pressing of the bearing jacket onto the monolith takes place during the first phase. Then in the subsequent second phase, the gap(s) is/are closed by pressing the bearing jacket against the monolith in the remaining peripheral section(s). Due to the procedure according to this invention, a divided mold may be used for pressing the large peripheral sections. When using a divided mold, a bulging of the bearing jacket may occur in the separation area of the mold parts. The individual mold parts are designed according to this invention with dimensions that are too small to press the bearing jacket against the monolith along the entire circumference, so the bearing jacket can yield into the gap(s) formed between the mold parts during the first phase without resulting in damage to the bearing jacket. Then in the second phase, the bulging or protruding bearing jacket is pressed against the monolith in the area of the gap(s) by using appropriate molds, this subsequent pressing operation being implementable in such a way that it does not result in any damage to the bearing jacket. Although the pressing of the bearing jacket according to this invention is performed with the help of two phases taking place in succession, relatively high cycle numbers can be achieved, permitting relatively inexpensive mass production.

Other important features and advantages of this invention are derived from the subclaims, the drawings and the respective description of figures on the basis of the drawings.

It is self-evident that the features mentioned above and to be explained below can also be used either alone or in other combinations in addition to the combinations described here without going beyond the scope of the present invention.

A preferred embodiment of this invention is illustrated in the drawings and is explained in greater detail in the following description, where the same reference numbers refer to the same or functionally identical or similar parts.

Figure 3:
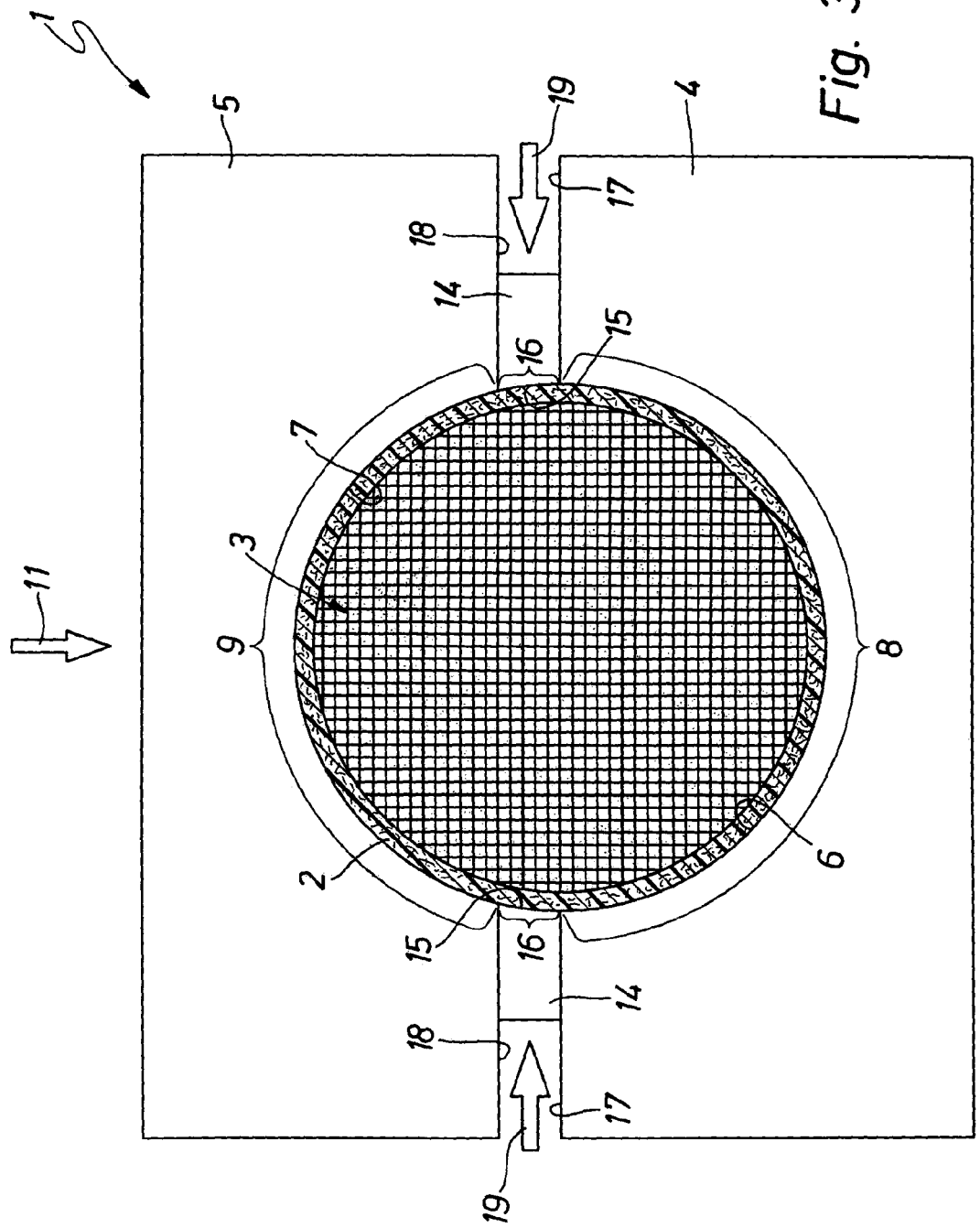

The figures show in schematic drawings:

FIG. 1 a perspective view of a device according to this invention in which two mold parts are in their open position;

FIG. 2 a front view of the device according to an arrow II in FIG. 1, where the mold parts are in their closed position while two slide gates are in their starting positions;

FIG. 3 a view like that in FIG. 2, but showing the slide gates in their end position.

According to FIGS. 1 through 3, a device 1 according to this invention for pressing a bearing jacket 2 against a monolith 3 of a catalytic converter, in particular of an automotive catalytic converter, includes a first mold part 4 and a second mold part 5. The monolith 3 has a cylindrical body having a round cross section, in particular a circular or elliptical or oval cross section.

The first mold part 4 has a first partial mold 6. Accordingly, the second mold part 5 has a second partial mold 7. The two partial molds 6, 7 are shaped to be complementary to a first peripheral section 8 and/or a second peripheral section 9 of the monolith 3, including an additional measure for taking into account the pressed bearing jacket 2 sheathing the monolith 3 on the periphery. The first peripheral section 8 and the second peripheral section 9 are indicated by curved brackets in FIGS. 2 and 3.

The two mold parts 4, 5 are adjustable between an open position shown in FIG. 1 and a closed position shown in FIGS. 2 and 3 using a suitable device, which is traditional and therefore is not shown here. The adjusting movement of the two mold parts 4, 5 takes place here in such a way that the two mold parts 4, 5 are moved relative to one another across a longitudinal axis 10 of the monolith 3. A configuration in which the mold parts 4, 5 are adjusted relative to one another in or against the direction of gravitational force, represented by an arrow 11 in FIG. 1, between their open position and their closed position relative to one another. In the preferred embodiment shown here, it is also important that the first mold part 4 is situated beneath the second mold part 5 with respect to the direction 11 of gravitational force. Essentially, however, any other spatial alignment is also possible.

As indicated in FIG. 1, in the open position of the mold parts 4, 5, the monolith 3 together with the bearing jacket 2 surrounding it, which is still in an unpressed condition, can be inserted into one of the aforementioned partial molds 6, 7, in this case into the first partial mold 6. Since the bearing jacket 2, which is usually formed by a swelling mat or the like, is still unpressed in this condition, the monolith 3 sheathed with the bearing jacket 2 is not pressed completely into the first partial mold 6.

According to FIGS. 2 and 3, the mold parts 4 and 5 in their closed position press the bearing jacket 2 against the monolith 3 in the first peripheral section 8 and in the second peripheral section 9. As indicated in FIGS. 2 and 3, the first peripheral section 8 and the second peripheral section 9 are each dimensioned to be approximately half as large as the total circumference of the monolith 3 surrounded by the bearing jacket 2 pressed onto it. According to this invention, however, the peripheral sections 8, 9 assigned to the two partial molds 6, 7 are together smaller than the total circumference of the monolith 3 sheathed by the bearing jacket 2 pressed onto it. Accordingly, there is a hole or a gap 12 between the first and the second partial molds 6, 7 of the two mold parts 4, 5 on the two opposing sides of the monolith 3. Since the adjusting movement of the two mold parts 4, 5 takes place radially with respect to the longitudinal axis 10 of the monolith 3, the opposing gaps 12 are expediently of the same size and are arranged symmetrically.

When pressing the bearing jacket 2 along the first and second peripheral sections 8 and 9, in the area of these gaps 12 the bearing jacket 2 may bulge or protrude outward in an area 13, so that the bearing jacket 2 protrudes into the gap 12. It is clear that the mold parts 4, 5 have recesses of suitable dimensions in the area of these gaps 12.

A slide gate 14 is assigned to each of these gaps 12 and/or these bulges 13 according to this invention. These slide gates 14 are arranged between the first partial mold 6 and the second partial mold 7 and have a third partial mold 15 on a side facing the bearing jacket 2, being dimensioned suitably for closing the respective gap 12. Every third partial mold 15 is designed to be complementary to a third peripheral section 16 of the monolith 3 having the bearing jacket 2 pressed onto it. Accordingly, the two third partial molds 15 supplement the first partial mold 6 and the second partial mold 7 in such a way that all four partial molds 6, 7, 15 can press the bearing jacket 2 against the monolith 3 along the entire circumference.

To this end, the slide gates 14 are adjustable between an initial position shown in FIG. 2 and an end position shown in FIG. 3. In the embodiment shown here, the adjusting movement of the slide gates 14 is across the longitudinal axis 10 of the monolith 3 and across the adjusting movement of the mold parts 4, 5. Although in their initial position, the slide gates 14 are arranged at a distance from the inverted and as yet unpressed area 13 of the bearing jacket 2, in their end position according to FIG. 3 they press the bearing jacket 2 against the monolith 3 in the particular respective third peripheral section 16.

As shown in FIG. 3 in particular, the peripheral sections 8 and 9 assigned to the first partial mold 6 and the second partial mold 7 together with the third peripheral sections 16 assigned to the third partial molds 15 are of the same size as the total circumference of the monolith 3 with the bearing jacket 2 sheathing it and pressed against it.

As shown in embodiment illustrated here, the slide gates 14 are adjustable in the direction of their adjusting movement in contact with and expediently along the entire axial length of the monolith 3 and/or the partial molds 6, 7, 15 along an outside 17 of the first mold part 4 facing the second mold part 5 and along an outside of the second mold part 5 facing the first mold part 4. This adjusting movement is represented by arrows 19 in FIG. 3. This design achieves the result that damage to the bearing jacket 2 does not occur when adjusting the slide gates 14 into their end position according to FIG. 3. In particular, the material of the bearing jacket 2 cannot be pinched between the elements moving relative to one another.

With the help of the device 1 according to this invention, it is possible to implement the pressing of the bearing jacket 2 with a two-part mold consisting of the mold parts 4 and 5, whereby it is possible to prevent pinching and damage to the bearing jacket 2 in the area of the mold division due to the measures according to this invention. This makes it possible in particular to displace the monolith 3 with the bearing jacket 2 pressed onto it out of the position shown in FIG. 3, i.e., with mold parts 4, 5 adjusted to their closed position and with slide gates 14 adjusted to their end positions, displacing it into a prefabricated pipe (not shown here) in the axial direction of the monolith 3. This pipe expediently has an inside cross section which is equal to the outside cross section of the monolith 3 sheathed with the bearing jacket 2 pressed onto it. Then it is possible to omit the use of insertion aids, in particular insertion funnels.

As shown in FIGS. 2 and 3 in particular, with the mold parts 4, 5, the peripheral sections 8, 9 assigned to the first and second partial molds 6, 7 are each approximately half as large as the total circumference of the monolith 3 with the bearing jacket 2 pressed onto it. Consequently, the first and the second peripheral sections 8, 9 are each much larger than either of the two third peripheral sections 16. In the embodiment shown here, the first peripheral section 8 assigned to the first partial mold 6 is half as large or approximately half as large as the total circumference of the monolith 3 sheathed by the bearing jacket 2 pressed onto it. Consequently, the second peripheral section 9 and both of the third peripheral sections 16 together are approximately the same size as the first peripheral section 8. In the embodiment shown here, the first mold part 4 is situated beneath the second mold part 5 with respect to the direction of gravitational force 11, so this yields the following advantage here: If, after ejection or outward displacement of the monolith 3 sheathed with the bearing jacket 2 pressed onto it, particles of the bearing jacket 2 remain adhering to the partial molds 6, 7, 15, they cannot reach one of the bearing surfaces of the sides 14 or can do so only with a greatly reduced probability when the slide gates 14 are retracted and when the mold parts 4, 5 are moved back. The sliding surfaces of the slide gates 14 are formed here by the mutually facing outsides 17, 18 of the mold parts 4, 5. Soiling of the sliding surfaces (17, 18) and damage to the slide gates 14 can thus be avoided.

In the embodiment shown here, the two slide gates 14 are adjustably mounted on the second mold part 5. In this way, it is possible in particular to provide a common drive for the second mold part 5 and the two slide gates 14, this drive in principle having a design such that a driving force which causes the second mold part 5 to be lowered onto the first mold part 4 is deflected to the drive of the two slide gates 14 on reaching the closed position of the two mold parts 4, 5. Likewise, it is essentially possible to provide a drive, which is independent of the mold parts 4, 5, for the slide gates 14.

For the outward displacement of the monolith 3 including the bearing jacket 2 pressed onto it, the device 1 according to this invention may have a pull-out device (not shown here) having a ram or a plunger which is adapted with regard to its cross section accordingly, penetrating axially into the cooperating partial molds 6, 7, 15 in the axial direction of the monolith 3 and in particular pushing the monolith 3 together with the bearing jacket 2 pressed onto it into said prefabricated pipe. This pipe may already form a part, in particular a middle piece, of an automotive catalytic converter.

The device 1 Functions as Follows According to this Invention:

In the open position according to FIG. 1, the monolith 3 together with the bearing jacket 2, which sheaths it on the periphery but has not yet been pressed onto it, is inserted into the first partial mold 6 of the first mold part 4. To this end, the mold parts 4, 5 are in their open position. Then the mold parts 4, 5 are moved into their closed position according to FIG. 2. During this first phase, the bearing jacket 2 is pressed onto the monolith 3 in the first peripheral section 8 and in the second peripheral section 9. Since these two peripheral sections 8 and 9 are smaller than the total circumference of the monolith 3 with the bearing jacket 2 pressed onto it, the bearing jacket 2 may bulge out into the gaps 12 in the areas 13 without resulting in damage to the bearing jacket 2 here.

During a subsequent second phase, the slide gates 14 are moved from their initial position according to FIG. 2 into their final position according to FIG. 3, whereby the bearing jacket 2 is pressed onto the monolith 3 in the third peripheral sections 16, which are situated between the first and the second peripheral sections 8 and 9. Since the third partial molds 15 are matched to the first and the second partial molds 6, 7, the bearing jacket 2 is pressed uniformly against the monolith 3 along its entire circumference after the end of the second phase.

The invention claimed is:

1. A method of inserting a bearing jacket and a monolith of a catalytic converter, in particular of a motor vehicle, into a pipe, wherein before inserting the monolith with the bearing jacket into the pipe the bearing jacket (2) surrounding the monolith (3) on the periphery is pressed onto the monolith (3) in a first peripheral section (8) during an initial phase and in a second peripheral section (9), whereby the two peripheral sections (8, 9) together are smaller than the total circumference of the monolith (3) surrounded by the bearing jacket (2) pressed onto it;

the bearing jacket (2) is pressed onto the monolith (3) during a subsequent second phase in at least one third peripheral section (16) situated between the first peripheral section (8) and the second peripheral section (9), whereby the first peripheral section (8) and the second peripheral section (9) together with all the third peripheral sections (16) are the same size as the total circumference of the monolith (3) surrounded by the bearing jacket (2) pressed onto it; and wherein the monolith with the bearing jacket pressed therein is inserted into the pipe.

2. The method according to claim 1, wherein the first peripheral section (8) and the second peripheral section (9) are each approximately half as large as the total circumference of the monolith (3) surrounded by the bearing jacket (2) pressed onto it;

the first peripheral section (8) and the second peripheral section (9) are each definitely larger than each individual third peripheral section (16).

3. The method according to claim 1, wherein two mutually opposite third peripheral sections (16) are provided;

the first peripheral section (8) being approximately as large as the second peripheral section (9) and the two third peripheral sections (16) together.

4. The method according to claim 1, wherein the monolith (3) with the bearing jacket (2) pressed onto it is inserted directly into a prefabricated pipe whose inside cross section corresponds to the outside cross section of the monolith (3) surrounded by the bearing jacket (2) pressed onto it.

* * * * *